(12) United States Patent
Pachon et al.

(10) Patent No.: US 7,379,887 B2
(45) Date of Patent: May 27, 2008

(54) INTEGRATED DECISION SUPPORT SYSTEM FOR OPTIMIZING THE TRAINING AND TRANSITION OF AIRLINE PILOTS

(75) Inventors: Julian Enrique Pachon, Austin, TX (US); Benjamin Glover Thengvall, Austin, TX (US)

(73) Assignee: Accenture Global Services GmbH, Schaffhausen (CH)

( * ) Notice: Subject to any disclaimer, the term of this patent is extended or adjusted under 35 U.S.C. 154(b) by 1319 days.

(21) Appl. No.: 10/062,099

(22) Filed: Jan. 31, 2002

(65) Prior Publication Data

US 2003/0163334 A1 Aug. 28, 2003

(51) Int. Cl.
 *G06F 17/50* (2006.01)
(52) U.S. Cl. .................................................. 705/7
(58) Field of Classification Search ............ 705/1, 705/7
 See application file for complete search history.

(56) References Cited

U.S. PATENT DOCUMENTS

| | | | |
|---|---|---|---|
| 4,797,839 A | | 1/1989 | Powell |
| 5,053,970 A | * | 10/1991 | Kurihara et al. ............ 700/104 |
| 5,265,006 A | | 11/1993 | Asthana et al. |
| 5,450,317 A | | 9/1995 | Lu et al. |
| 5,794,224 A | | 8/1998 | Yufik |
| 6,064,981 A | | 5/2000 | Barni et al. |
| 6,076,067 A | | 6/2000 | Jacobs et al. |
| 6,078,912 A | | 6/2000 | Buerger et al. |
| 6,161,097 A | | 12/2000 | Zink et al. |
| 6,240,362 B1 | | 5/2001 | Gaspard, III |
| 6,263,315 B1 | | 7/2001 | Talluri |
| 6,275,767 B1 | | 8/2001 | Delseny et al. |
| 6,275,812 B1 | | 8/2001 | Haq et al. |
| 6,278,965 B1 | | 8/2001 | Glass et al. |
| 6,292,806 B1 | | 9/2001 | Sandifer |

OTHER PUBLICATIONS

Dialog "US Airways Flexes Muscle With New Pilot Contract, Plans for Low-cost Unit"; Oct. 1997; Airline Financial News vol. 12; Dialog file 264, Accession No. 0027619.*
Gang Yu, Benjamin Thengvall, Julian Pachon, Darryal Chandler, & Al Wilson, "Optimized Pilot Planning and Training at Continental Airlines", INFORMS, Oct. 17, 2001 , U.S.
Peter J. Verbeek, "Decision Support Systems- An application in strategic manpower planning of airline pilots",European Journal of Operational Research, vol. 55 (1991), pp. 368-381.
Bard, Jonathan F. *A Decomposition Approach to the Inventory Routing Problem with Satellite Facilities*. Nov. 1996, pp. 1-29.

(Continued)

*Primary Examiner*—Romain Jeanty
(74) *Attorney, Agent, or Firm*—Oppenheimer Wolff & Donnelly LLP

(57) ABSTRACT

An automated optimization system for generating multiple alternative training and transition plans for airline pilots which include a recall of furloughed pilots, and limits to deviation of pilot start bid periods for training assignments from a specific bid period, wherein such plans are cost optimized to track payroll costs of pilots recalled from furlough, and the combined time for solving an MIP Model representation and generating such plans therefrom is less than one hour.

20 Claims, 4 Drawing Sheets

OTHER PUBLICATIONS

*Class Scheduling for Pilot Training.* pp. 1-37.
Bard, Jonathan F. *Class Scheduling For Pilot Training.* Jun. 2001; pp. 1-37.
Verbeek, Peter. Decision Support Systems—*An Application in Strategic Manpower Planning of Airline Pilots.* European Journal of Operational Research 55 (1991) 368-381.
Yu, Gang., et. al. *Optimized Pilot Planning and Training at Continental Airlines.*
Jarrah, A, et. al. *A Decision Support Framework for Airline Flight Cancellations and Delays.* Transportation Science, vol. 27, Aug. 1993.pp. 266-280.
Rakshit, A., et. al. *System Operations Advisor: A Real-Time Decision Support System for Managing Airline Operations at United Airlines.* Interfaces 26: 2 Mar. 2,-Apr. 1996 (pp. 50-58).
Hasse, Knut. *Course Planning at Lufthansa Technical Training: Constructing More Profitable Schedules.* Interfaces 29: Sep. 5,-Oct. 1999 (pp. 95-109).

* cited by examiner

INTEGRATED DECISION SUPPORT SYSTEM FOR OPTIMIZING THE TRAINING AND TRANSITION OF AIRLINE PILOTS

RELATED APPLICATION

U.S. patent application Ser. No. 10/054,343, entitled "Integrated Decision Support System for Optimizing the Training and Transition of Airline Pilots", with filing date of Nov. 13, 2001, and assigned to the assignee of the present invention.

FIELD OF THE INVENTION

The invention relates generally to decision support systems, and more particularly to an improved decision support system for providing to strategic planners alternative optimized training plans with options for timing the recall of furloughed pilots and for limiting the effect of start bid period changes on current training and transition plans.

BACKGROUND OF THE INVENTION

Numerous systems have been developed to overcome the complexity of determining when training and transition is to occur, and for which crew members, at which locations, at what times, and with an appropriate allocation of training resources including equipment and instructors.

The prior art systems have included both manual and automated systems with response times ranging from days, to weeks, and even months. Further, such systems have tended to implement a decision making process for providing a single solution, rather than a dynamic, adaptive, decision support system providing alternative solutions for evaluation by a strategic planner. In addition, such prior systems have been represented by models which either are too complex for commercial software solution, or have simplifying assumptions that make them too unrealistic for practical use. Prior systems also have generally been too costly in employee and equipment resources. See "Decision Support Systems-An application in strategic manpower planning of airline pilots" by Peter J. Verbeek, European Journal of Operational Research 55 (1991), pages 368-381, Elsevier Science Publishers B. V. While the Verbeek article does not disclose a decision support system, it does describe the enormous complexities which must be addressed in designing such a system to accommodate the large numbers of constraints and variables that are required for a solution to be realistic. Verbeek also referred to his own mixed integer model which was admittedly too complex for solution with commercial software, and thus too costly in time.

From the above it may be discerned that the problem of pilot staffing and training is one of the most complex and costly problems facing the major airlines. If not managed effectively, an airline cannot survive, not to mention profit, in the competitive air transportation market.

By way of example, Continental airlines provides both domestic and international service to more than 100 destinations around the world. They operate 325 aircraft of nine different fleet types to fly 1400 daily flights. Their 5000 pilots are stationed at three domestic and two international crew bases. At least twice a year Continental conducts a system bid award. These awards provide an opportunity for pilots to use their seniority to increase their pay and improve their work schedules by changing their position (base, fleet, and status), and a way for the airline to adjust staffing levels in response to retirements, attrition, and changes in their business plan. In an average system bid award, 15-20% of the airline's pilots receive new positions. The problem of taking the pilots who have received new positions, and finding a training class for each pilot requiring training, an advancement date for each pilot changing position without training, and a release date for each pilot leaving the airline, is a very large NP-hard problem to attempt to solve. Additional complexity for Continental comes from the facts that: pilot positions are interrelated; the timing and number of training classes is variable; minimal length student training schedules must be generated using limited resources; and numerous complicating regulations and business rules related to each pilot's seniority, flight history, and current and future position must be considered.

Continental manpower planners with expert knowledge took more than two weeks to manually generate a single, partial, sub-optimal training plan for ensuring adequate staffing levels with no detailed consideration of costs.

In contrast to the above prior art systems and methods, the system disclosed in related U.S. patent application Ser. No. 10/054,343, and assigned to the assignee of the present invention, is a realistic representation of the real world problem as evidenced by its implementation by Continental Airlines. The system is modeled so efficiently that it can be solved in under an hour. An hour is a huge improvement over the time required by the prior art systems, and is a very reasonable amount of time for a planning problem as complex as the one addressed in the generation of training and transition plans for all pilots of an entire airline.:

In response to a system bid award, the system manages large volumes of data, and employs state-of-the-art optimization modeling and solution techniques, to efficiently allocate human and training resources and attain optimal operational and cost effective performance. A training and transition plan is generated by the system which establishes the timing and number of pilot new hires, training assignments, advancements, and releases. The plan also provides the number of pilots whose training or release should be postponed, and the flow of pilots across different positions in a manner that ensures adequate staffing levels, minimum cost, and efficient utilization of training resources.

After an initial training and transition plan is established, crew planners often face changes in the airline operating environment which necessitate changes to the original plan. For example, in the event of a new bid award which occurs only a couple times each year, pilots may be scheduled for training and transition without regard to any existing plan. Events such as the following, however, often lead to changes in training and transition plans on as small as a monthly basis to maintain staffing levels: new market opportunities, the acquisition and retirement of aircraft and training resources, opening and closing sub-bases, and modification to the number of hours to be flown from different pilot positions to allow the airline to take advantage of business opportunities. Upon the occurrence of such change events, crew planners want to make as few adjustments as possible to the current training and transition plan to avoid disrupting the schedules of a large number of pilots.

The invention is an improvement over the system of U.S. patent application Ser. No. 10/054,343, and was created to overcome the challenges of timing the recall of pilots who have been furloughed from an airline, and also to limit any effect on current training and transition plans during the process of building a new plan.

Pilots who have been furloughed by the airline by contractual agreement must be brought back to the airline in seniority order, and must be brought back before any new pilots are hired by the airline. Two constraints are included in a mixed integer programming model (MIP Model) of the invention to determine when furloughed pilots will be recalled, and to ensure that contractual obligations are met in doing so. Two additional constraints are included to limit the percentage of pilots whose start bid periods are moved out of the bid period of the current plan, and to limit the total percentage of pilots whose start bid periods are either moved into or moved out of the bid period of the current plan.

Prior to the invention, crew planners used manual methods to provide solutions in overcoming the furloughed pilot recall and limited effect problems. Such manual methods were too time consuming for consideration of solution costs. Emphasis was placed mainly on staffing levels. Rather than hours to days being consumed in reaching a manual solution, the invention makes possible multiple alternative solutions in under one hour which address change events giving rise to a need to recall furloughed pilots, or to a need for limited start bid period changes to a current training and transition plan. In addition to the time savings, the solutions derived by this invention are optimized against the airline's costs while maintaining ideal staffing levels.

SUMMARY OF THE INVENTION

An improved decision support system and method for rapid generation of multiple alternative training and transition plans for all pilots of an entire airline, wherein such plans are derived from an optimized and realistic solution of a mixed integer programming model representation of the pilot training/transition problem which includes options for recalling furloughed pilots, and for limiting the impact that the generation of new plans will have on an existing plan (hereafter "MIP Model").

In one aspect of the invention, constraints are added to the MIP Model to ensure that pilots recalled from furlough are brought back in order of seniority.

In another aspect of the invention, constraints are added to the MIP Model to ensure that no new pilots are hired until all pilots being recalled from furlough have been recalled.

In yet another aspect of the invention, constraints are added to the MIP Model to limit the percentage of pilots whose start bid period may be moved out of a bid period of a current training and transition plan in generating multiple alternative training and transition plans that address a change event.

In a further aspect of the invention, constraints are added to the MIP Model to limit the percentage of pilots whose start bid period may either enter or leave a bid period of a current training and transition plan in generating new multiple alternative training and transition plans.

In a still further aspect of the invention, the MIP Model is rapidly solved to provide multiple alternative training and transition plans which are optimized with respect to furlough recall costs while maintaining required staff levels.

BRIEF DESCRIPTION OF THE DRAWINGS

Additional objects, features and advantages of the present invention will become apparent from the following detailed description when read in conjunction with the accompanying drawings in which.

DESCRIPTION OF PREFERRED EMBODIMENTS

Figure 1:
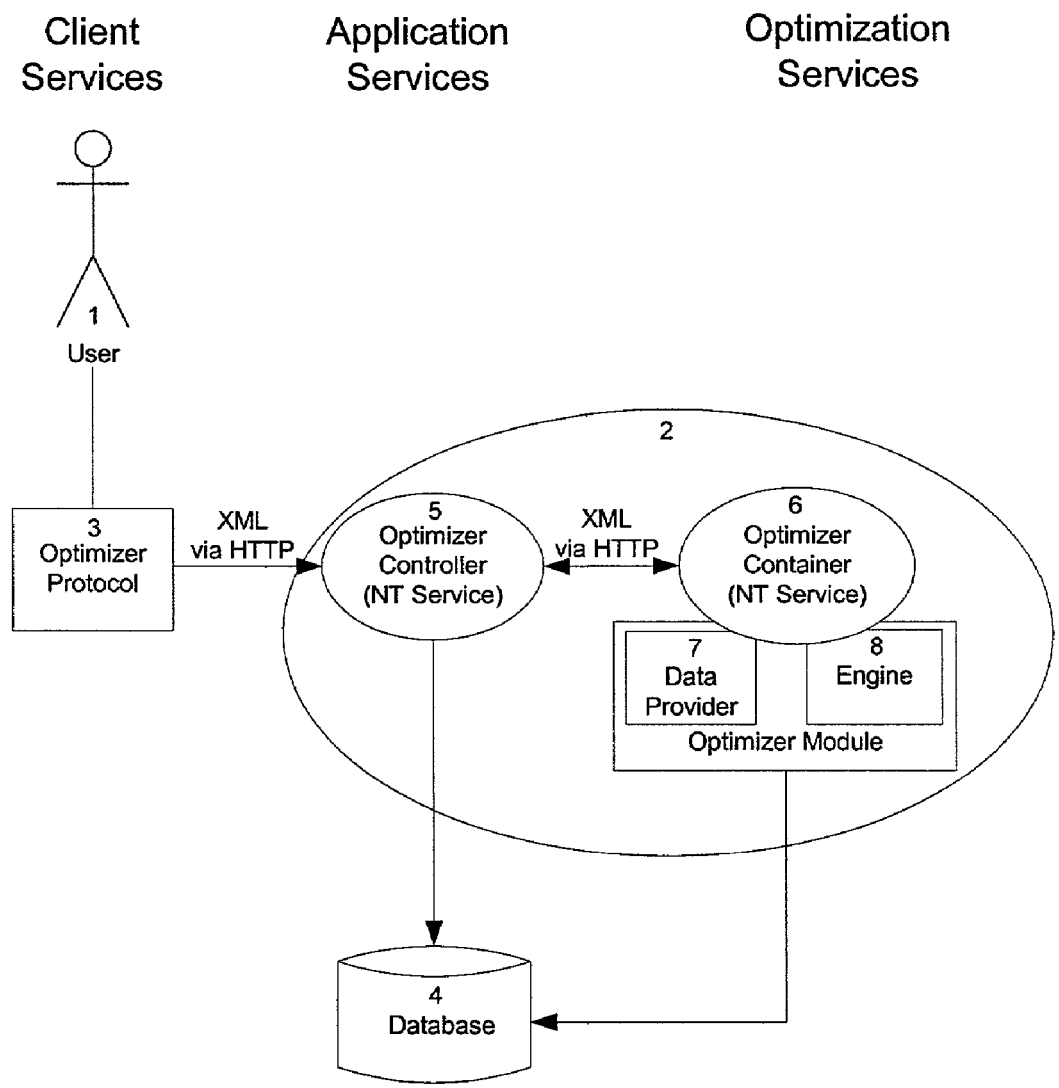
FIG. 1 is a functional block diagram of a training and transition plan optimization system in accordance with the invention.

Preferred embodiments of the invention will now be described with reference to the accompanying drawings. In the description, terms defined in Tables I-VIII, whether capitalized or in lower case, shall have the attendant meanings indicated below when used in this specification:

TABLE I

| Term | Definition |
| --- | --- |
| System Bid | A seniority-based award in which an airline adjusts staffing levels in response to retirements, attrition, and changes in their business plan by awarding pilots new positions. |
| System Bid Information | Complete information on a pilot's awarded position from a specific system bid. |
| Bid Effective Date | Date by which all pilots should be advanced to their awarded positions for a specific system bid. |
| Average Pay Hours | Average number of hours per bid period for which a pilot in a certain position is paid. |
| Utilization | Average number of hours per bid period during which a pilot works. |
| Start Bid Period | Bid period in which the training assignment for a pilot begins. |
| Bid Period | A time period roughly equivalent to a calendar month during which pilots may transition to a new position. |
| Training Capacity | Maximum number of students that can start training for a given fleet in a given bid period. |
| Pay Protection | Penalty paid to a pilot in certain cases where a junior pilot is advanced ahead of a senior pilot, or other contractual obligations are not met by the airline. |
| Training Plan | Establishes the timing and number of pilot hires, training assignments, advancements, and releases. |
| Training Schedule | Detailed daily schedule for all students and training resources based on the classes found in the training plan. |
| Total Shortage | The shortage of pilots measured as the deficit in ability to cover block hours in each pilot position each bid period. |
| Total Excess | The excess of pilots measured as the overage in ability to cover block hours in each pilot position each bid period. |
| MIP Model | The mixed integer programming mathematical model that represents the training and transition problem for airline pilots, and which is used to obtain solutions to this problem. |
| Key | The unique identifier of a variable or constraint in the model. |
| Level of Importance | The weighting (1-5) given to each cost factor demonstrating its importance relative to other cost factors. |
| Cost Factor | An item used to weigh the value of one solution vs. other solutions. |
| Optimizer Engine | An optimizer or optimizer engine is a program implementing operations research algorithms, and producing an optimized solution based upon user input and system data. |
| Optimizer Session | A request to an optimizer engine to perform its function. |
| Optimizer Container | A generic hosting environment in which Optimizer Engines execute Optimizer Sessions. |
| Objective Function | An objective or objective function is an algebraic expression that combines variables with variable costs. |
| Status | The seat a pilot is assigned to in an aircraft, for example captain, first officer, or second officer. |
| Equipment | A type of aircraft. |
| Advanced Pilot | Pilot who has moved from an old assignment to a new awarded assignment. |
| Furloughed Pilot | Pilot who receives a system bid award indicating that he will be released from the airline. |

TABLE I-continued

| Term | Definition |
|---|---|
| No Award Pilot | Pilot having an age greater than 60 who receives a bid award indicating that he must be released from the airline. |
| Included Pilot | Pilot whose new system bid award involves movement to a new position in the airline, or who is released or furloughed from the airline. |
| Age 58 Pilot | Pilot who will be 58 or older by the effective date of the system bid. These pilots have special rules for bidding and pay protection. |
| Base | A geographical location where pilots are stationed. |
| Sub-base | A combination of a type of aircraft and a base. |
| Position | A combination of a sub-base and status, for example a pilot may be a captain flying DC10 aircraft out of the Houston base. |
| Block Hours | The scheduled flight hours the airline plans to operate. |
| Input Data | Includes Pilot Data, bid information including the identity of pilots to be recalled from furlough, average pay hours, scheduled pilot training assignments and advancements, utilization, pay protection, training capacity, operational and contractual constraints affecting training, variables such as vacation and retirement criteria, and optimizer options such as a limit on the extent current pilot training and transition plans may be modified |
| Pilot Data | Includes system bid award information, currently scheduled training assignments and advancements, average pay hours, pilot utilization, pay protection, vacation and absence information, new hire information, and retirement criteria; and training information including training capacity by fleet, and operational and contractual constraints affecting training. |

The environment in which the invention operates is illustrated in FIG. 1, in which user requests and input data are provided by a client 1 to an optimizer system 2 by way of a user interface including an optimizer protocol layer 3. The optimizer protocol layer 3 uses an XML-based transaction protocol via HTTP over TCP/IP to communicate with the optimizer system 2, which in turn provides input data to a data base 4. In the preferred embodiment, the optimizer system 2 is deployed on a Compaq ProLiant Server with 4 Pentium III 550 MHz processors.

The data base 4 has stored therein input data including but not limited to pilot data comprising system bid award information, currently scheduled training assignments and advancements, average pay hours, pilot utilization, pay protection, vacation and absence information, and retirement criteria; and training information including training capacity by fleet, and operational and contractual constraints affecting training. The data base also stores customer optimization requests, and information associated with each request such as request status information. In the preferred embodiment, the data base 4 is a Microsoft SQL Server 2000 relational database.

The optimizer system 2 is comprised of an optimizer controller 5 which receives user requests from the optimizer protocol layer 3, and notification and optimizer update messages from an optimizer container 6 whose primary function is to communicate with an optimizer data provider 7 and an optimizer engine 8. In the preferred embodiment, the data base 4, the optimizer controller 5, and the optimizer container 6 are part of a computer system operating under the Microsoft Windows 2000 Advanced Server Operating System.

In response to a user request, the optimizer controller 5 creates an optimizer session for storage into the data base 4, and sends a request acknowledgement and an optimizer session reference to the optimizer protocol layer 3 for relay to the user. Thereafter, the optimizer controller 5 notifies the optimizer container 6 of the request for services by way of an RPC call (processing instructions provided by the XML transaction protocol) routed via HTTP over TCP/IP (a transport protocol implementation).

The optimizer container 6 thereupon verifies to the optimizer controller 5 that it has the necessary resources and request parameters to accommodate the user request. The optimizer container 6 then initializes the optimizer data provider 7 to obtain necessary data from the data base 4 for use by the optimizer engine 8. In the preferred embodiment, the data provider 7 and the optimizer engine 8 are deployed as Windows dynamic link libraries.

The optimizer engine 8, which in the preferred embodiment is an optimizer engine solving a training and transition plan problem, implements operations research algorithms to produce an optimized solution based on the received request. In response to the above verification from the optimizer container 6, the optimizer controller 5 updates the optimizer session status stored in the data base 4 to indicate that the user request is being executed. The optimizer protocol layer 3, upon polling the optimizer controller 5, is thereby notified of the status of the user request and so informs the client 1. Once the optimizer data provider 7 is initialized, the optimizer container 6 sends the user request to the optimizer engine 8 for execution.

The results obtained from the optimizer engine 8 are received by the optimizer container 6, which forwards the results to the optimizer controller 5. The optimizer controller 5 thereupon updates the optimizer session status to indicate that the user request has been executed, and that the results are available for access by the user.

Upon the user querying the optimizer controller 5 by way of the optimizer protocol layer 3, the user is informed that the user request has been executed and is provided the results generated by the optimizer engine 8.

The invention described and claimed below resides in the optimizer engine 8 in the form of a software program for developing, solving, and interpreting the results of a mixed integer programming model ("MIP Model") that provides a cost optimized solution to the problems of training and transitioning airline pilots, recalling furloughed pilots, and limiting the extent of modifications made to an existing training and transition plan in generating new plans following a system bid or to address change events (events occurring regularly between scheduled system bid awards that may necessitate the generation of new training and transition plans).

Figure 2:
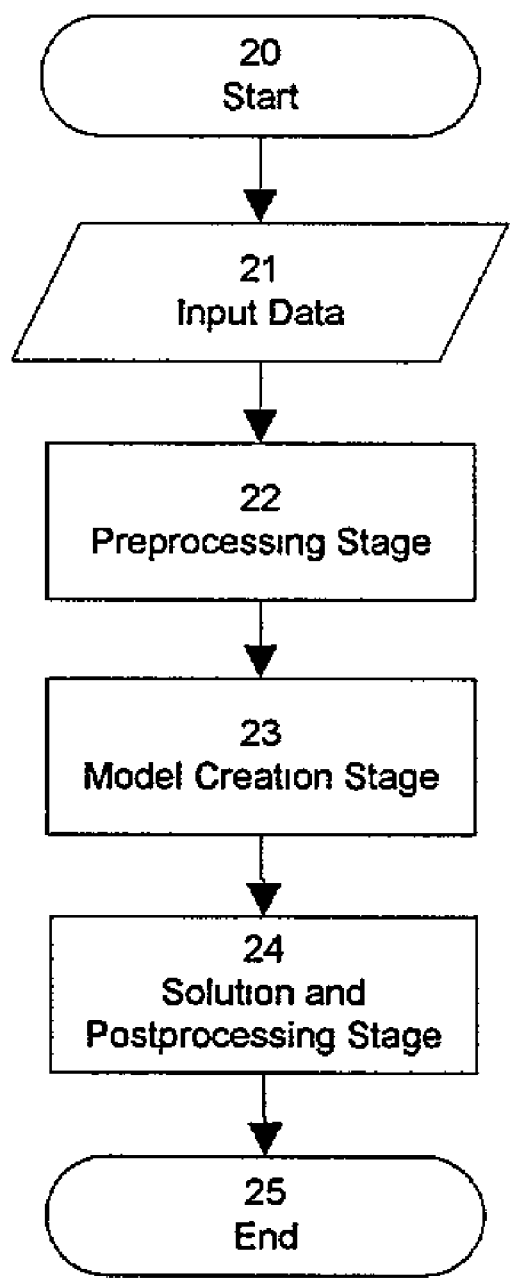
FIG. 2 is a logic flow diagram of the operation of optimizer engine 8 of FIG. 1.

A functional block diagram of the optimizer engine 8 is provided in FIG. 2, where the logic flow process in accordance with the invention begins at logic step 20, and then proceeds to logic step 21 where data provided by the optimizer data provider 7 of FIG. 1 by way of optimizer container 6 is received by an input data module. Such data comprises bid information including the identity of pilots to be recalled from furlough, average pay hours, scheduled pilot training assignments and advancements, utilization, pay protection, training capacity, operational and contractual constraints affecting training, variables such as vacation and retirement criteria, and optimizer options such as a limit on the extent current pilot training and transition plans may be modified.

The logic flow process continues from logic step 21 to logic step 22 where the content of the input data module of logic step 21 is applied in the form of an XML document to a preprocessing stage. The preprocessing stage in turn creates data structures that provide separate lists of pilots which have been sorted in accordance with received user options and other input data. The data structures of logic step 22 then are applied by the logic flow process to a model creation stage at logic step 23, and are operated upon to create a mathematical mixed integer programming model (MIP Model) that represents the pilot training and transition problem mathematically through an objective function and a combination of constraints and variables. These variables and constraints include those which control the recalling of furloughed pilots, and the extent to which current pilot training and transition plans may be modified to accommodate the recall. Once the MIP Model is created, the logic flow process continues to the model solution and postprocessing stage of logic step 24, where optimal variable values are found for the MIP Model. The optimal variable values then are postprocessed to determine and display the solution results. The solution is referred to as a training plan that is then stored for review by the user.

The MIP Model is presented below followed by detailed logic flow descriptions of each of the stages illustrated in FIG. 2. The values for indices, sets, parameters, and variables used in the MIP Model are provided by the user 1 or retrieved by the optimizer controller 5 of FIG. 1 from the database 4.

Model Indices

Indices that are used in the MIP Model equations that follow are defined in Table II.

TABLE II

| Index | Index Description |
| --- | --- |
| i, j | Pilots. For each pilot the type of class he needs to attend is known. |
| f | Fleets |
| h | Combinations of Fleet and Status. If the problem is solved by position, then h will correspond to the combination's base, equipment, and status. |
| t, k | Bid periods (including an extra bid period for those pilots that will not be trained during the planning horizon due to capacity constraints). |

Model Sets

Sets that are used in the MIP Model equations that follow are presented in Table III.

TABLE III

| Set | Set Description |
| --- | --- |
| φ(i) | Bid periods in which pilot i can complete his training. This set is determined during the preprocessing of variables described above. |
| φ(f, t) | Pilots that can start training for fleet f in the bid period t. |
| λ | Set of pilots that need to be advanced. |
| $\lambda_1$ | Set of pilots that need to be advanced, not including the age 58 pilots that hold a bid and could have held a better bid. |
| $\lambda_2$ | Set of age 58 pilots that hold a bid and could have held a better bid. |
| $\lambda_{FR}$ | Set of furloughed pilots that need to be recalled. |
| NA | Pilots with no-award who will turn age 60 between now and the effective date of the system bid award. |
| F | Furlough no award pilots. |
| L(i) | Length of training in bid periods for pilot i. This value is positive for pilots requiring training, and is zero for pilots who are eligible to advance without training. |

Model Parameters

Parameters which are used in the MIP Model equations that follow are defined below.

TABLE IV

| Parameter | Parameter Description |
| --- | --- |
| $a_i$ | Pay protection cost paid to pilot i per bid period, if any (difference between his future pay rate and his current pay rate). |
| PBH | Cost associated with block hours. |
| PS | Level of importance of shortages in block hours in the solution. |
| PE | Level of importance of excess in block hours in the solution. |
| Ppay | Level of importance of pay protection cost in the solution. |
| PNH | Level of importance of new hires cost in the solution. |
| PNA | Level of importance of no-awards cost in the solution. |
| PF | Level of importance of furloughs cost in the solution. |
| $MNH_{ht}$ | Maximum allowable new hires for position h in bid period t. |
| $NHCost_{ht}$ | Cost per new hire pilot advanced to position h in bid period t (computed as number of bid periods between t and the end of planning horizon, times the pay rate, times the average pay hours). |
| $NACost_{it}$ | Cost if pilot i∈NA is released in bid period t (computed as number of bid periods between t and the beginning of planning horizon, times the pay rate, times the average pay hours). |
| $FCost_{it}$ | Cost if pilot i∈F is released in bid period t (computed as number of bid periods between t and the beginning of planning horizon, times the pay rate, times the average pay hours). |
| $FRCost_{it}$ | Cost if pilot i∈$\lambda_{FR}$ is advanced in bid period t (computed as number of bid periods between t and the end of planning horizon, times the pay rate, times the average pay hours). |
| $Blockhrs_{ht}$ | Business plan block hours for position h in bid period t. |
| N | Length of the planning horizon in bid periods. |

Model Variables

Variables appearing in the MIP Model equations that follow are described below.

For Pilots included in the training set (i∈λ)

$$y_{it} = \begin{cases} 1 & \text{if pilot } i \text{ is advanced in bid period } t \\ 0 & \text{otherwise} \end{cases} \quad (1)$$

The $y_{it}$ variable will only exist for bid periods during which pilot i is eligible to complete his training. Some bid periods may not be possible due to vacation or other absences.

For pilots included in the No-Award set (i∈NA):

$$y_{NAit} = \begin{cases} 1 & \text{if pilot } i \text{ is released in bid period } t \\ 0 & \text{otherwise} \end{cases} \quad (2)$$

For pilots included in the Furlough set (i∈F):

$$y_{Fit} = \begin{cases} 1 & \text{if pilot } i \text{ is released in bid period } t \\ 0 & \text{otherwise} \end{cases} \quad (3)$$

"$RF_i$" is computed as:

$$RF_i \geq \left(N - R_{58i} - \sum_{t \in \phi(i)} t y_{it} + R_i\right), \quad (4)$$

where $N-R_{58i}$ is the bid period a pilot starts being pay-protected for the position he could have held but did not (for all pilots 58 years old with bid and potential pay protection different from zero); and $$\sum_{t \in \phi(i)} t y_{it} - R_i$$

is the bid period the pilot starts being pay-protected for the position he holds. When the position the pilot could have held is better than the one he holds, he can always get at least the $R_{58i}$ and could potentially receive more bid periods of pay protection (i.e. $M_i$).

Other variables appearing in the MIP Model equations are defined in Table V below.

TABLE V

| Variable | Variable Description |
|---|---|
| $y_{FRit}$ | A binary variable indicating whether pilot $i \in \lambda_{FR}$ is recalled in bid period t, taking a value 1 if the pilot is recalled and 0 otherwise. |
| $y_{NHht}$ | The number of new hires advanced in bid period t for position h. |
| $S_{ht}$ | Number of block hours short for position h in the bid period t. |
| $E_{ht}$ | Number of excess block hours for position h in the bid period t. |
| $R_i$ | Number of bid periods in pay protection paid to pilot $i \in \lambda$. |
| $M_i$ | Min ($RF_i$, $R_i$), the total number of bid periods the pilot is pay-protected for the position he holds. |
| $R_{58i}$ | Number of bid periods in pay protection paid to pilot $i \in$ age 58 pilots (for all pilots 58 years old with a bid and without a bid). |

MIP Model

The MIP Model is comprised of the objective function of equation (5) below and constraints which upon solution provide for multiple alternative pilot training and transition plans which are realistic and feasible, and which upon exercise of user options provide for recalls of furloughed pilots, and limits on the percentage of pilots whose start bid periods for training assignments may enter into or depart from a bid period of a pre-existing pilot training and transition plan. The above results may be obtained in less than an hour.

Objective Function $$\text{Minimize } PNH \sum_t \sum_h NHCost_{ht} y_{NHht} + PNA \sum_t \sum_{i \in NA} NACost_{it} y_{it} +$$

$$PF \sum_t \sum_{i \in F} FCost_{it} y_{it} + Ppay\left(\sum_{i \in \lambda_1} a_i R_i + \sum_{i \in 58Y} a_i R_{58i} + \sum_{i \in \lambda_2} a_i M_i\right) + \quad (5)$$

-continued $$PS * PBH \sum_h \sum_t S_{ht} / Blockhrs_{ht} +$$

$$PE * PBH * (1/3) \sum_h \sum_t E_{ht} / Blockhrs_{ht} + PF \sum_t \sum_{i \in \lambda_{FR}} FRCost_{it} y_{FRit}$$

Except for the last objective component, which addresses cost of recalling furloughed pilots, the above objective function is offered commercially by CALEB Technologies Corp., 9130 Jollyville Road, Suite 100, Austin, Tex. 78759, as a software product referred to as the ManpowerSolver System. The last term of the above objective function is a cost factor which is added as part of the present invention to track the payroll cost of pilots recalled from furlough from the bid period in which they are recalled until the end of the planning horizon.

Additional Constraints

In order to address the recall of furloughed pilots, or to address other change events without unduly disrupting existing pilot training and transition plans, the following additional sets, parameters, variables, and constraints are required.

Model Sets

TABLE VI

| Set | Set Description |
|---|---|
| $Adv_t$ | Set of pilots whose current training assignment has a start bid period of t |

Model Parameters

TABLE VII

| Parameter | Parameter Description |
|---|---|
| i' | The pilot $i \in \lambda_{FR}$ with the least seniority. |
| $W_i$ | Start bid period in the current solution in which the training assignment for pilot i begins. |
| $U_t$ | The number of pilots whose current training assignmnent ha a start bid period of t, i.e. the number of pilots in the set $Adv_t$. |
| $P\_U_t$ | The maximum percentage of pilots in a new solution whose current training assignment start bid period can change from bid period t. This is a user-entered value for each bid period. |
| BigM | An integer larger than N, where N is the length of the planning horizon. |
| $CM_{it}$ | Binary indicator having a value of one if the current training assignment start bid period for pilot i is bid period t. |

Model Variables

TABLE VIII

| Variable | Variable Description |
|---|---|
| $d_i$ | A nonnegative integer variable representing the number of bid periods the training assignment start bid period of pilot i has been delayed in a new solution. |
| $q_i$ | A nonnegative integer variable representing the number of bid periods the training assignment start bid period of pilot i has been moved forward in a new solution. |

TABLE VIII-continued

| Variable | Variable Description |
| --- | --- |
| $h_i$ | A binary variable indicating whether the start bid period of the training assignment of pilot i is changed. |
| $diff_{it}$ | A binary variable indicating whether the start bid period of the training assignment for pilot i is moved in to or out of bid period t. |

To ensure that furloughed pilots are recalled in seniority order, the constraint of equation (6) below is employed.

$$\sum_{t=k}^{N} y_{FRit} - \sum_{t=k}^{N} y_{FRi-1t} \leq 0 \qquad \forall\ i \in \lambda_{FR}, k \in \{1\ ...\ N\} \qquad (6)$$

To ensure no new pilots are hired before all furloughed pilots are recalled, the constraint of equation (7) below is added to require that the most junior pilot from furlough be recalled before any new hires in a bid period occur.

$$y_{NHht} - MNH_{ht}\sum_{t=1}^{k} y_{FRi't} \leq 0 \qquad \forall\ h, k \in \{1\ ...\ N\} \qquad (7)$$

The constraints of equations (8)-(10) below ensure limited modification to the number of pilots changing the start bid period of their training assignments from the bid periods assigned in the current training and transition plan.

$$\sum_{t} t y_{it-L(i)} - W_i - d_i + q_i = 0 \qquad \forall\ i \in \lambda \qquad (8)$$

$$d_i + q_i \leq BigM^* h_i\ \forall\ i \in \lambda \qquad (9)$$

$$\left(\sum_{i \in Adv_t} h_i / U_t\right) \leq P\_U_t \qquad \forall\ t \in \{1\ ...\ N\} \qquad (10)$$

The constraints of equations (11)-(13) below ensure that the number of pilots changing the start bid period of their training assignments to either enter or leave the bid period assigned in a pre-existing training and transition plan is limited.

$$diff_{it} = 1 - y_{it}\ \forall\ i \in \lambda, t \in \{1\ ...\ N\} | CM_{it} = 1 \qquad (11)$$

$$diff_{it} = y_{it}\ \forall\ i \in \lambda, t \in \{1\ ...\ N\} | CM_{it} = 0 \qquad (12)$$

$$\sum_{i \in \lambda} diff_{it} / U_t \leq P\_U_t \qquad \forall\ t \in \{1\ ...\ N\} \qquad (13)$$

The equations of constraints (8)-(10), and the equations of constraints (11)-(13) represent alternative approaches to limiting modifications to a pre-existing training and transition plan in generating new plans in response to change events. The first set of equations limits only movement of pilot start bid periods out of a current bid period, while the second set of equations limits the total movement of pilot start bid periods into and out of the current bid period. Either approach may be implemented, depending on the preference of the user.

Figure 3:
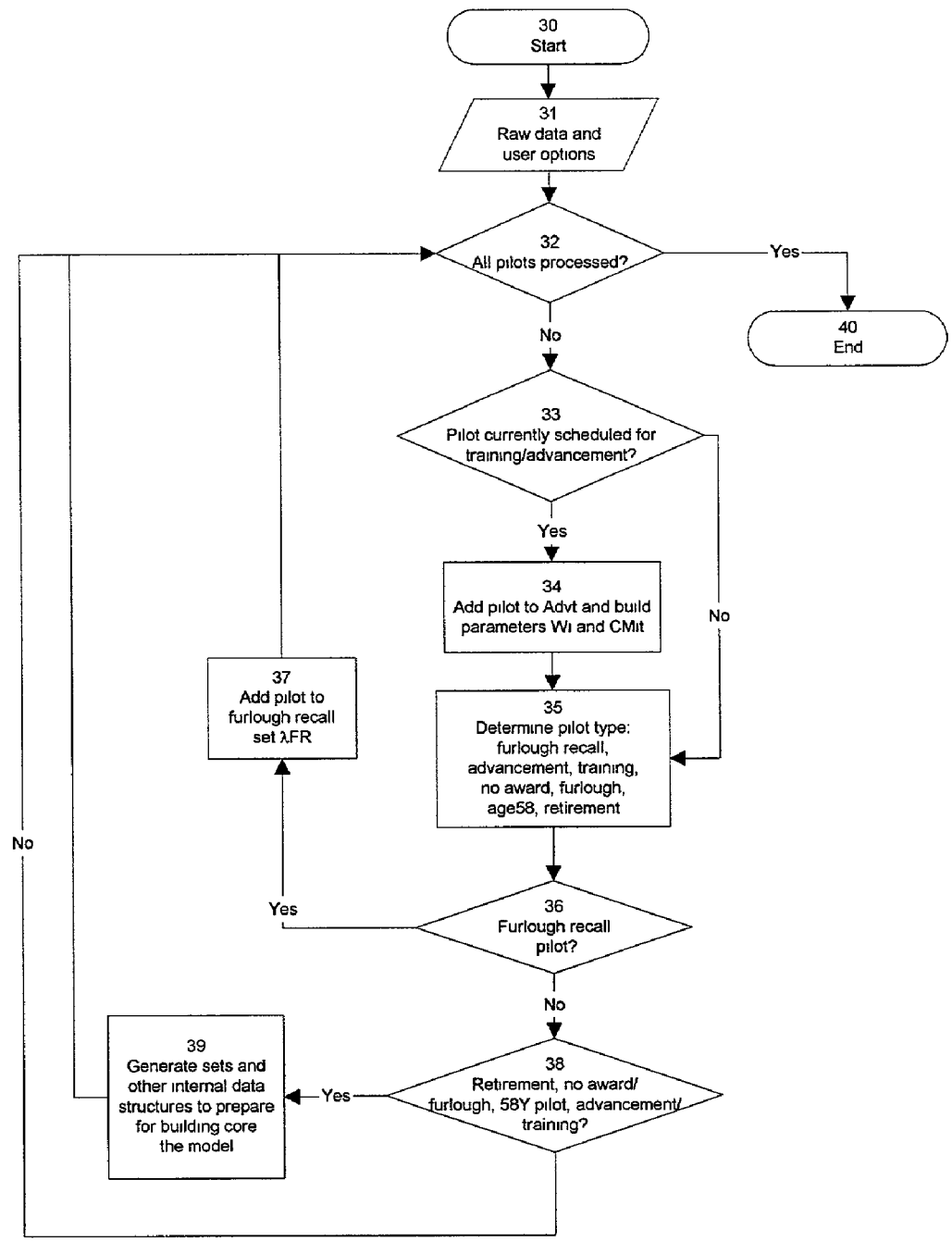
FIG. 3 is a logic flow diagram of the preprocessing stage 22 of FIG. 2 in accordance with the invention.

The preprocessing stage of logic step 22 of FIG. 2 is illustrated in more detail in FIG. 3, where the previously described content of the input data module at logic step 21 is supplied in the form of an XML document. The data supplied consists of general information regarding each pilot in the airline including each pilot's bid award for the system bid for which a training plan is being created. FIG. 3 illustrates how each pilot's information is sorted in preparation for the model creation stage of logic step 23 of FIG. 2.

Referring to FIG. 3, the logic flow process enters the optimization engine 8 at logic step 30, and then proceeds to logic step 31 where data from the optimizer data provider 7 of FIG. 1 is received. The data includes pilot data such as system bid award information, scheduled pilot training assignments and advancements, average pay hours, new hire information, pilot utilization, pay protection, pilot vacation and absence information, and retirement criteria. Other information is also included such as block hour requirements per position each bid period, and user options. With this data, the logic flow process continues to logic step 32 and enters a loop that will analyze the data for each pilot. The other pieces of data do not require processing and are stored in the database 4 of FIG. 1 for use in the model creation stage of logic step 23 of FIG. 2. Through this analysis of data, sets and other internal data structures are prepared for the model creation stage of logic step 23.

The logic flow process next advances from logic step 32 to logic step 33 of FIG. 3 where a determination is made as to whether the pilot under consideration is already scheduled for training and advancement. If so, the logic flow process proceeds to logic step 34 where the pilot is added to the set Adv$_t$, and information for the pilot is added to the parameters W$_i$ and CM$_{it}$. After completing logic step 34, or if the pilot under consideration at logic step 33 is not currently scheduled for training and advancement, the logic flow process moves to logic step 35. At logic step 35, it is determined whether the pilot falls into any of the following categories: furlough recall, advancement, training, no award, furlough, age 58, and retirement pilots. A list is created with all pilots falling within one of the above categories. The logic flow process then proceeds to logic step 36 to determine whether the pilot is a furlough recall pilot. If so, the logic flow process moves from logic step 36 to logic step 37 where the furlough recall pilot is added to the set $\lambda_{FR}$. The logic flow process then returns to logic step 32 to determine whether there are any further pilots to process. If so, the logic flow process continues as before described.

If a furlough recall pilot is not identified at logic step 36, the logic flow process advances to logic step 38 to determine whether the pilot under consideration is an advancement, training, no award, furlough, age 58, or retirement pilot. If so, the logic flow process jumps to logic step 39 where sets and other internal data structures are generated to prepare for building a core model. From logic step 39, the logic flow process loops back to logic step 32 to continue as before described. If at logic step 38 it is determined that the pilot under consideration is neither an advancement, training, no award, furlough, age 58, or retirement pilot, the logic flow process loops back to logic step 32 to continue as before described.

Figure 4:
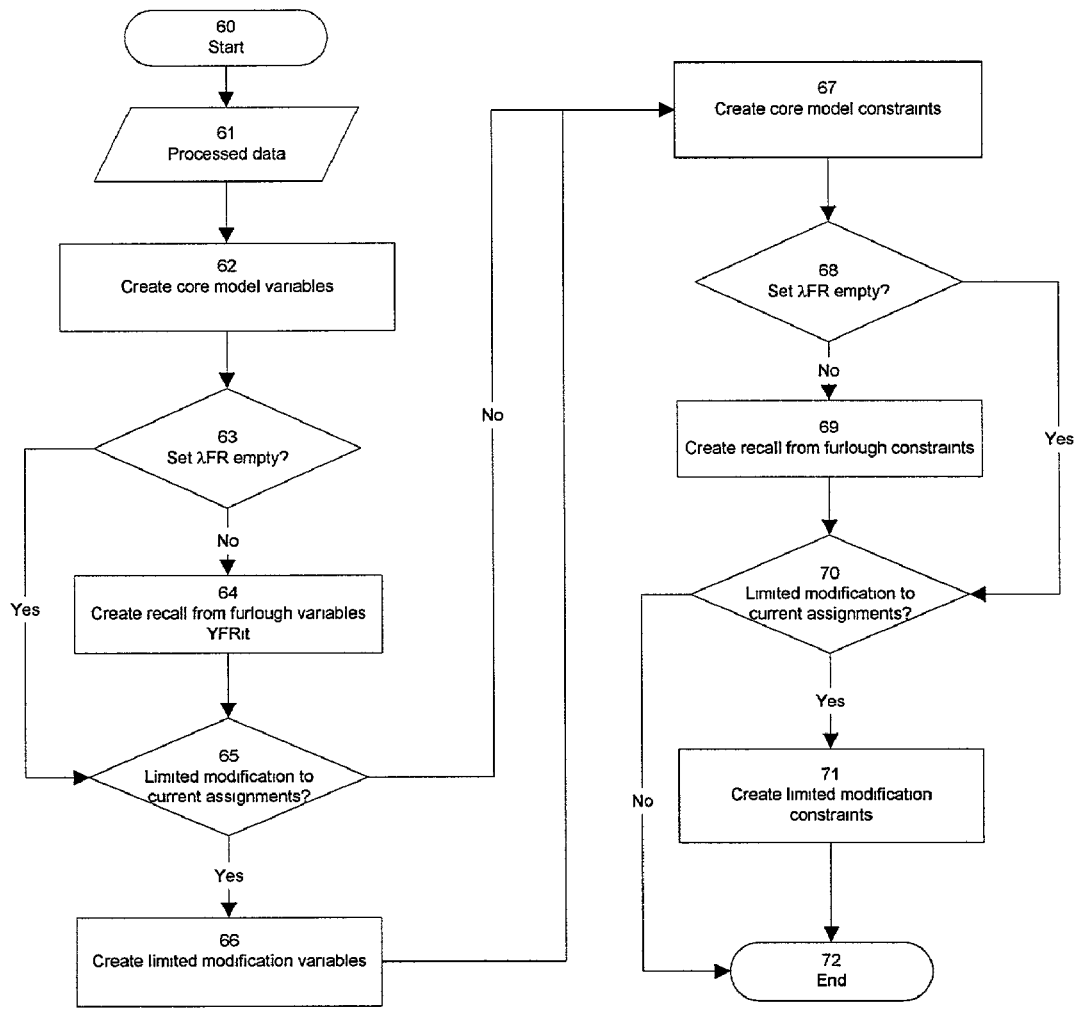
FIG. 4 is a logic flow diagram of the model creation stage 23 of FIG. 2 in accordance with the invention.

When it is determined at logic step 32 that all pilots have been processed, the logic flow process proceeds to logic step 40 to transfer to the model creation stage 23 of FIG. 2 and perform in accordance with the logic flow diagram of FIG. 4

Referring to FIG. 4, the logic flow process begins at logic step 60, and continues to logic step 61, where the preprocessed data prepared in the preprocessing stage of FIG. 3 is used to construct all of the variables and constraints needed to build the MIP Model (as described above) in view of the options chosen by the user. The left most column of logic steps in FIG. 4 is directed to the creation of variables, and the right most column of logic steps is directed to the creation of constraints.

Each variable that is created is a combination of a key and a value, and has a numeric type, a class type, and a list of the constraints of which it is a member. A key is used to uniquely identify a variable and is built by concatenating attributes that the variable represents. For example, the key for a variable describing the advancement of a pilot is the pair including the pilot's ID, and the bid period in which the pilot can advance. For variables describing the shortages in block hours for training, the key is the triple of fleet, status and bid period. The value of a variable refers to the value given upon solution of the MIP Model. The numeric type refers to variable type, which can be a binary variable, an integer variable, or a continuous variable. The class type of a variable refers to a description of the meaning of the variable. An example of a class type of variables is assignment variable.

Each constraint that is created is logically grouped into a constraint set, and each set of constraints has a specific class type. For example, all constraints in the system that enforce the requirement that furloughed pilots have to be recalled in seniority order belong to a single constraint set. Whenever a constraint is added to a constraint set, all the variables that are part of the constraint are identified, and the constraint list for each variable is modified to include the constraint. The class type of a set of constraints refers to a description of the meaning of the constraints. An example of a class type of constraints is recall furlough in seniority order constraints.

From logic step 61 of FIG. 4, the logic flow process continues to logic step 62 where all core model variables required by the MIP Model are created from the list previously created in the preprocessing stage of FIG. 3. The logic flow process then proceeds to logic step 63 to determine whether there are pilots being recalled from furlough as a result of the system bid award. If a recall of furloughed pilots exists, i.e. the set $\lambda_{FR}$ is not empty, the logic flow process continues from logic step 63 to logic step 64 to create recall from furlough variables $y_{FRit}$ is for use in the furlough recall constraints of equations (6) and (7) and in the objective function of equation (5). After logic step 64, or if it is determined at logic step 63 that there are no pilots being recalled from furlough, the logic flow process proceeds to logic step 65 where it is determined whether the user selected the option to limit modification to current assignments. If so, the logic flow process advances to logic step 66 to create limited modification variables $d_i$, $q_i$, and $h_i$ or $\text{diff}_{it}$ as described above.

After logic step 66, or if it is determined at logic step 65 that the user has not selected the option to limit modification of current assignments, the logic flow process moves to logic step 67 where the creation of constraints including those of the present invention occurs.

The logic flow process then proceeds to logic step 68 to determine whether there are pilots being recalled from furlough as a result of a system bid award. If recall from furlough pilots exist, the logic flow process continues to logic step 69 where the recall from furlough constraints of equations (6) and (7) are created. After logic step 69, or if it is determined at logic step 68 that there are no pilots being recalled from furlough, the logic flow process proceeds to logic step 70.

At logic step 70 it is determined whether the user selected the option to limit modification of start bid periods for training assignments. If so, the logic flow process advances to logic step 71 to create the limited modification constraints of equations (8), (9), and (10), or the limited modification constraints of equations (11), (12), and (13). After logic step 71, or if it is determined at logic step 70 that the user has not selected the option to limit modification of current assignments, the logic flow process moves to logic step 72 to transfer to the solution and postprocessing stage of logic step 24 of FIG. 2.

The related U.S. patent application Ser. No. 10/054,343, filing date of Nov. 13, 2001, and assigned to the assignee of the present invention, discloses a method and system for generating multiple alternative pilot training and transition plans in less than one hour. The current invention is an improvement over that of the above Application in that the MIP Model comprising the objective function of equation (5) above with constraints including the constraints of equations (6)-(13) may be solved in less than one hour to provide for the recall of furloughed pilots, and for a limitation of the percentage of pilots whose start bid periods for training assignments may deviate from a bid period of a pre-existing pilot training and transition plan during the process of generating new plans in response to change events. The rapid solution in less than one hour is accomplished by integrating into the optimizer engine 8 of FIG. 1 commercially available software development kits and runtime libraries such as ILOG Concert Technology 1.0 and ILOG CPLEX 7.0 sold by ILOG, Inc. of Paris, France. Multiple alternative solutions which are realistic and feasible, and optimized to be cost effective, are thereby provided.

The present invention has been particularly shown and described in detail with reference to a preferred embodiment, which is merely illustrative of the principles of the invention and is not to be taken as a limitation to its scope. It further will be readily understood by those skilled in the art, operations research, that substitution of equivalent elements, reordering of steps, and other modifications and alterations of the invention may occur without departing from the scope and spirit of the invention. The appended claims are intended to include within their scope such modifications and alterations.

What is claimed is:

1. A system for rapidly generating multiple alternative pilot training and transition plans which include a recall of furloughed pilots for an entire airline, which comprises:
   a user interface receiving input data and user requests including a request to recall said furloughed pilots;
   a database having stored therein said input data and a current pilot training and transition plan; and
   an optimizer system in electrical communication with said user interface and said database for receiving said user requests, said input data, and said current pilot training and transition plan for generating MIP (mixed integer programming) Model which includes said recall of said furloughed pilot, wherein MIP is mixed integer problem, and rapidly solving said MIP Model to provide said multiple alternative pilot training and transition plans;

wherein said MIP Model includes following objective function:

$$\text{Minimize } PNH \sum_t \sum_h NHCost_{ht} y_{NHht} + PNA \sum_t \sum_{i \in NA} NACost_{it} y_{it} +$$

$$PF \sum_t \sum_{i \in F} FCost_{it} y_{it} + Ppay \left( \sum_{i \in \lambda_1} a_i R_i + \sum_{i \in 58Y} a_i R_{58i} + \sum_{i \in \lambda_2} a_i M_i \right) +$$

$$PS * PBH \sum_h \sum_t S_{ht} / Blockhrs_{ht} +$$

$$PE * PBH * (1/3) \sum_h \sum_t E_{ht} / Blockhrs_{ht} + PF \sum_t \sum_{i \in \lambda_{FR}} FRCost_{it} y_{FRit}$$

wherein PNH is Level of importance of New Hire Cost in the solution;

$NHCost_{ht}$ is Cost per new hire advanced to position h in period t (computed as the number of month between t and the end of the planning horizon, times the pay rate, times the average pay hours);

PNA is Level of importance of no-awards cost in the solution;

$NACost_{it}$ is Cost if pilot i∈NA is released in bid period t (computed as the number of months between t and the beginning of the planning horizon, times the pay rate, times the average pay hours);

$FCost_{it}$ is Cost if pilot i∈F is furloughed in bid period t (computed as the number of months between t and the beginning of the planning horizon, times the pay rate, times the average pay hours);

Ppay is Level of importance of pay protection cost in the solution;

PS is Level of importance of shortages in block hours in the solution;

PE is Level of importance of excess in block hours in the solution;

PF is Level of importance of furloughs cost in the solution;

PBH is Cost associated to each block hour missed due lack of crews; and $Block_{ht}$ is Business plan block hours for position h in bid period t.

2. The system of claim 1, wherein said multiple alternative pilot training and transition plans are generated in less than one hour, and are cost optimized.

3. The system of claim 1, wherein said recall of said furloughed pilots occurs in order of seniority and before any new pilots are hired.

4. The system of claim 1, wherein said user requests include a user option to limit percentage of pilots whose start bid periods for training assignments occur outside of a bid period of said current pilot training and transition plan.

5. The system of claim 1, wherein said user requests include a user option to limit total percentage of pilots whose start bid periods for training assignments occur within a bid period of said current pilot training and transition plan, and of said pilots whose start bid periods for training assignments occur outside of said bid period.

6. The system of claim 1, wherein said MIP Model includes following constraint to ensure that said furloughed pilots are recalled in seniority order:

$$\sum_{t=k}^{N} y_{FRit} - \sum_{t=k}^{N} y_{FRi-1t} \le 0 \qquad \forall i \in \lambda_{FR}, k \in \{1 \ldots N\}.$$

7. The system of claim 1, wherein said MIP Model includes following constraint to ensure that new pilots are hired after all of said furloughed pilots are recalled:

$$y_{NHht} - MNH_{ht} \sum_{t=1}^{k} y_{FRi't} \le 0 \qquad \forall h, k \in \{1 \ldots N\}.$$

8. The system of claim 1, wherein said MIP Model includes following constraints to limit percentage of pilots whose start bid periods for training assignments may deviate from a bid period of said current pilot training and transition plan:

$$\sum_t t y_{it-L(i)} - W_i - d_i + q_i = 0 \qquad \forall i \in \lambda; \qquad (i)$$

$$d_i + q_i \le BigM * h_i \ \forall i \in \lambda; \text{ and} \qquad (ii)$$

$$\left( \sum_{i \in Adv_t} h_i / U_t \right) \le P\_U_t \qquad \forall t \in \{1 \ldots N\}. \qquad (iii)$$

9. The system of claim 1, wherein said MIP Model includes following constraints to limit total percentage of pilots whose start bid period for training assignments may be changed to occur within a bid period of said current pilot training and transition plan, and of said pilots whose start bid period for training assignments may be changed to occur outside of said bid period:

$$diff_{it} = 1 - y_{it} \ \forall i \in \lambda, t \in \{1 \ldots N\} | CM_{it} = 1; \qquad (i)$$

$$diff_{it} = y_{it} \ \forall i \in \lambda, t \in \{1 \ldots N\} | CM_{it} = 0; \text{ and} \qquad (ii)$$

$$\sum_{i \in \lambda} diff_{it} / U_t \le P\_U_t \qquad \forall t \in \{1 \ldots N\}. \qquad (iii)$$

10. A system for rapidly generating multiple alternative pilot training and transition plans which include a limit to changing start bid periods for training assignments for an entire airline, which comprises:

a user interface receiving input data and user requests including a request to limit changes to said start bid periods;

a database having stored therein said input data and a current pilot training and transition plan; and an optimizer system in electrical communication with said user interface and said database for receiving said user requests, said input data, and said current pilot training and transition plan, for generating an MIP (mixed integer programming) Model which includes said limit, wherein MIP is mixed integer problem and rapidly solving said MIP Model to provide said multiple alternative pilot training and transition plans;

wherein said MIP Model includes a following objective component for tracking payroll cost of pilots recalled from furlough:

$$PF \sum_t \sum_{i \in \lambda_{FR}} FRCost_{it} y_{FRit}$$

wherein PF is Level of importance of furloughs cost in the solution;

wherein $FRCost_{it}$ is Cost if pilot i $\in$ FR is advanced in bid period t (computed as the number of bid periods between t and the end of the planning horizon, times the pay rate, times the average pay hours); and wherein $y_{FRit}$ is a binary variable indicating whether pilot i $\in$ FR is recalled in bid period t, taking a value 1 if the pilot is recalled and 0 otherwise.

11. The system of claim 10, wherein said limit applies to a percentage of pilots whose start bid periods for training assignments may deviate from a bid period of said current pilot training and transition plan.

12. The system of claim 10, wherein said limit applies to total percentage of pilots whose start bid period for training assignments may be changed to occur within a bid period of said current pilot training and transition plan, and of said pilots whose start bid period for training assignments may be changed to occur outside of said bid period.

13. The system of claim 10, wherein said multiple alternative pilot training and transition plans are cost optimized, and a following objective component for tracking payroll costs of pilots recalled from furlough is included in the MIP model:

$$PF \sum_t \sum_{i \in \lambda_{FR}} FRCost_{it} y_{FRit}.$$

14. A system for generating multiple alternative pilot training and transition plans which include a recall of furloughed pilots for an entire airline, which comprises:

a user interface receiving input data and user requests including a request to recall said furloughed pilots;

a database having stored therein said input data; and an optimizer system in electrical communication with said user interface and said database for receiving said user requests and said input data, and generating therefrom an MIP (mixed integer programming) Model including said recall of said furloughed pilots, wherein MIP is mixed integer problem, and for solving said MIP Model to rapidly generate said multiple alternative pilot training and transition plans;

wherein said multiple alternative pilot training and transition plans are cost optimized and generated in less than one hour, and said MIP Model includes a following objective component for tracking payroll costs of pilots recalled from furlough:

$$PF \sum_t \sum_{i \in \lambda_{FR}} FRCost_{it} y_{FRit}$$

wherein PF is Level of importance of furloughs cost in the solution;

wherein $FRCost_{it}$ is Cost if pilot i$\in$FR is advanced in bid period t (computed as the number of bid periods between t and the end of the planning horizon, times the pay rate, times the average pay hours); and wherein $y_{FRit}$ is a binary variable indicating whether pilot i$\in$FR is recalled in bid period t, taking a value 1 if the pilot is recalled and 0 otherwise.

15. The system of claim 14, wherein said MIP Model includes following constraints to limit percentage of pilots whose start bid periods for training assignments may differ from a specific bid period:

$$\sum_t Ty_{it-L(i)} - W_i - d_i + q_i = 0 \quad \forall i \in \lambda; \quad (i)$$

$$d_i + q_i \leq BigM^* h_i \; \forall i \in \lambda; \text{ and} \quad (ii)$$

$$\left(\sum_{i \in Adv_t} h_i / U_t\right) \leq P\_U_t \quad \forall t \in \{1 \ldots N\}. \quad (iii)$$

16. The system of claim 14, wherein said MIP Model includes following constraints to limit total percentage of pilots whose start bid period for training assignments may be changed to occur within a specific bid period, and of said pilots whose start bid period for training assignments may be changed to occur outside of said bid period:

$$diff_{it} = 1 - y_{it} \; \forall i \in \lambda, t \in \{1 \ldots N\} | CM_{it} = 1; \quad (i)$$

$$diff_{it} = y_{it} \; \forall i \in \lambda, t \in \{1 \ldots N\} | CM_{it} = 0; \text{ and} \quad (ii)$$

$$\sum_{i \in \lambda} diff_{it} / U_t \leq P\_U_t \quad \forall t \in \{1 \ldots N\}. \quad (iii)$$

17. An optimizer system including a database for rapid generation of multiple alternative pilot training and transition plans that accommodate a recall of furloughed pilots, which comprises:

data means for receiving user requests and input data from a user;

operating means in electrical communication with said data means for generating variables and constraints from said user requests and said input data, for generating an MIP (mixed integer programming) Model from said variables and said constraints which provides for said recall of said furloughed pilots in seniority order and before hiring of new pilots, wherein MIP is mixed integer problem; and means for solving said MIP Model with said variables and said constraints to generate therefrom said multiple alternative pilot training and transition plans with cost factor optimization;

wherein said MIP Model includes a following objective function:

$$\text{Minimize } PNH \sum_t \sum_h NHCost_{ht} y_{NHht} + PNA \sum_t \sum_{i \in NA} NACost_{it} y_{it} +$$

$$PF \sum_t \sum_{i \in F} FCost_{it} y_{it} + Ppay\left(\sum_{i \in \lambda_1} a_i R_i + \sum_{i \in 58Y} a_i R_{58i} + \sum_{i \in \lambda_2} a_i M_i\right) +$$

-continued $$PS*PBH\sum_h\sum_t S_{ht}/Blockhrs_{ht} +$$

$$PE*PBH*(1/3)\sum_h\sum_t E_{ht}/Blockhrs_{ht} + PF\sum_t\sum_{i\in\lambda_{FR}} FRCost_{it}y_{FRit}$$

wherein PNH is Level of importance of New Hire Cost in the solution;

$NHCost_{ht}$ is Cost per new hire advanced to position h in period t (computed as the number of month between t and the end of the planning horizon, times the pay rate, times the average pay hours);

PNA is Level of importance of no-awards cost in the solution;

$NACost_{it}$ is Cost if pilot i∈NA is released in bid period t (computed as the number of months between t and the beginning of the planning horizon, times the pay rate, times the average pay hours);

$FCost_{it}$ is Cost if pilot i∈F is furloughed in bid period t (computed as the number of months between t and the beginning of the planning horizon, times the pay rate, times the average pay hours);

Ppay is Level of importance of pay protection cost in the solution;

PS is Level of importance of shortages in block hours in the solution;

PE is Level of importance of excess in block hours in the solution;

PF is Level of importance of furloughs cost in the solution;

PBH is Cost associated to each block hour missed due lack of crews; and $Block_{ht}$ is Business plan block hours for position h in bid period t.

18. An optimizer system including a database for rapid generation of multiple alternative pilot training and transition plans that include a recall of furloughed pilots, which comprises:

data means for receiving user requests including a request to recall said furloughed pilots, and for receiving input data, and a current pilot training and transition plan;

operating means in electrical communication with said data means for receiving said user requests, said input data, and said current pilot training and transition plan, for generating variables and constraints therefrom, and for generating an MIP (mixed integer programming) Model from said variables and said constraints to provide said recall of said furloughed pilots in seniority order and before hiring of new pilots, and provide a limit to deviating start bid periods for training assignments with respect to a bid period of said current pilot training and transition plan; and means for solving said MIP Model with said variables and said constraints to generate said multiple alternative pilot training and transition plans with cost optimization, wherein said MIP Model includes a following objective function:

$$\text{Minimize } PNH\sum_t\sum_h NHCost_{ht}y_{NHht} + PNA\sum_t\sum_{i\in NA} NACost_{it}y_{it} +$$

$$PF\sum_t\sum_{i\in F} FCost_{it}y_{it} + Ppay\left(\sum_{i\in\lambda_1} a_iR_i + \sum_{i\in 58Y} a_iR_{58i} + \sum_{i\in\lambda_2} a_iM_i\right) +$$

$$PS*PBH\sum_h\sum_t S_{ht}/Blockhrs_{ht} +$$

$$PE*PBH*(1/3)\sum_h\sum_t E_{ht}/Blockhrs_{ht} + PF\sum_t\sum_{i\in\lambda_{FR}} FRCost_{it}y_{FRit}$$

wherein PNH is Level of importance of New Hire Cost in the solution;

$NHCos_{ht}$ is Cost per new hire advanced to position h in period t (computed as the number of month between t and the end of the planning horizon, times the pay rate, times the average pay hours);

PNA is Level of importance of no-awards cost in the solution;

$NACost_{it}$ is Cost if pilot i∈NA is released in bid period t (computed as the number of months between t and the beginning of the planning horizon, times the pay rate, times the average pay hours);

$FCost_{it}$ is Cost if pilot i∈F is furloughed in bid period t (computed as the number of months between t and the beginning of the planning horizon, times the pay rate, times the average pay hours);

Ppay is Level of importance of pay protection cost in the solution;

PS is Level of importance of shortages in block hours in the solution;

PE is Level of importance of excess in block hours in the solution;

PF is Level of importance of furloughs cost in the solution;

PBH is Cost associated to each block hour missed due lack of crews; and $Block_{ht}$ is Business plan block hours for position h in bid period t.

19. The optimizer system of claim 18, wherein said limit is applied to a percentage of pilots whose start bid periods for training assignments occur outside of said bid period.

20. The optimizer system of claim 18, wherein said limit is applied to a total percentage of said furloughed pilots whose start date for training assignments is changed to occur within said bid period, and of said furloughed pilots whose start date for training assignments is changed to occur outside of said bid period.

* * * * *